(12) United States Patent
Hong

(10) Patent No.: US 9,886,491 B2
(45) Date of Patent: Feb. 6, 2018

(54) SERVER IMPLEMENTED GEOGRAPHIC INFORMATION SYSTEM WITH GRAPHICAL INTERFACE

(71) Applicant: Palantir Technologies Inc., Palo Alto, CA (US)

(72) Inventor: Peter Hong, Kalamazoo, MI (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/209,477

(22) Filed: Jul. 13, 2016

(65) Prior Publication Data

US 2016/0357835 A1    Dec. 8, 2016

Related U.S. Application Data

(63) Continuation of application No. 14/730,123, filed on Jun. 3, 2015, now Pat. No. 9,460,175.

(51) Int. Cl.
| | | |
|---|---|---|
| *G06F 17/30* | (2006.01) | |
| *G06T 3/00* | (2006.01) | |
| *G06T 3/40* | (2006.01) | |
| *G06T 3/60* | (2006.01) | |

(Continued)

(52) U.S. Cl.
CPC ...... *G06F 17/30569* (2013.01); *G06F 3/0482* (2013.01); *G06F 3/04842* (2013.01); *G06F 17/30061* (2013.01); *G06F 17/30241* (2013.01); *G06F 17/30876* (2013.01); *G06F 17/30902* (2013.01); *G06T 3/0068* (2013.01); *G06T 3/40* (2013.01); *G06T 3/60* (2013.01); *G06T 2210/62* (2013.01)

(58) Field of Classification Search
CPC ......... G06F 17/30569; G06F 17/30061; G06F 17/30241; G06F 17/30876; G06F 3/04842; G06F 3/0482; G06F 17/30902; G06T 3/0068; G06T 3/40; G06T 3/60; G06T 2210/62
USPC ....................................................... 701/408
See application file for complete search history.

(56) References Cited

U.S. PATENT DOCUMENTS

| | | | |
|---|---|---|---|
| 6,100,897 | A | 8/2000 | Mayer et al. |
| 7,158,878 | B2 | 1/2007 | Rasmussen |
| 7,519,470 | B2 | 4/2009 | Brasche et al. |

(Continued)

FOREIGN PATENT DOCUMENTS

WO    WO-2001098925 A2    12/2001

OTHER PUBLICATIONS

"How to georectify an image in ArcMap 10", [Online] Retrieved from the internet: http://web.archive.org/web/20140223140531/http://gis.unc.edu/data/geog370/GeoreferencingLabGEOG37Q_Spring2013.pdf, (Feb. 23, 2014), 1-8.*

(Continued)

*Primary Examiner* — Brian P Sweeney
(74) *Attorney, Agent, or Firm* — Schwegman Lundberg & Woessner, P.A.

(57) ABSTRACT

Example embodiments described herein pertain to a geographic information system (GIS), configured to obtain geospatial data representing a geographic area, assign a projection and coordinate system to the geospatial data, apply a transformation to the geospatial data, and generate a tile cache based on the transformed geospatial data, the tile cache including the determined projection and coordinate system.

20 Claims, 11 Drawing Sheets

(51) Int. Cl.
*G06F 3/0484* (2013.01)
*G06F 3/0482* (2013.01)

(56) References Cited

U.S. PATENT DOCUMENTS

| | | | |
|---|---|---|---|
| 7,962,281 | B2 | 6/2011 | Rasmussen et al. |
| 8,290,943 | B2 | 10/2012 | Carbone et al. |
| 8,799,799 | B1 | 8/2014 | Cervelli et al. |
| 9,104,695 | B1 | 8/2015 | Cervelli et al. |
| 9,111,380 | B2 | 8/2015 | Piemonte et al. |
| 9,460,175 | B1 | 10/2016 | Hong |
| 2006/0197837 | A1 | 9/2006 | Flath et al. |
| 2015/0347457 | A1* | 12/2015 | Zhu .................. G06F 17/30241 707/743 |
| 2015/0370828 | A1* | 12/2015 | Maurer ............. G06F 17/30061 707/722 |

OTHER PUBLICATIONS

"U.S. Appl. No. 14/730,123, Notice of Allowance dated Apr. 12, 2016", 10 pgs.

"U.S. Appl. No. 14/730,123, Pre-Interview First Office Action dated Sep. 21, 2015", 4 pgs.

"U.S. Appl. No. 14/730,123, Pre-Interview First Office Action dated Dec. 7, 2015", 5 pgs.

"U.S. Appl. No. 14/730,123, Response filed Nov. 20, 2016 to Pre-Interview First Office Action dated Sep. 21, 2015", 1 pg.

"U.S. Appl. No. 14/730,123, Response filed Feb. 8, 2016 to First Action Interview Office Action dated Dec. 7, 2015", 18 pgs.

"European Application Serial No. 16172401.8, Extended European Search Report dated Oct. 7, 2016", 9 pgs.

"How to georectify an image in ArcMap 10", [Online] Retrieved from the internet: http://web.archive.org/web/20140223140 531/ http://gi s.une.edu/data/geog370/Georef erencingLabGEOG370_ Spri ng2013.pdf, (Feb. 23, 2014), 1-8.

\* cited by examiner

SERVER IMPLEMENTED GEOGRAPHIC INFORMATION SYSTEM WITH GRAPHICAL INTERFACE

CROSS-REFERENCE TO RELATED APPLICATION

This application is a continuation of U.S. patent application Ser. No. 14/730,123, filed Jun. 3, 2015, which is incorporated by reference herein in its entirety.

TECHNICAL FIELD

The subject matter disclosed herein generally relates to machines configured to process data. Specifically, example embodiments relate to a server implemented geographic information system.

BACKGROUND

A geographic information system (GIS) is a system designed to capture, store, manipulate, analyze, manage, and present geospatial data. Typically, a GIS uses a spatio-temporal location as the key index variable for all other information and calculations. A GIS can relate otherwise unrelated information (e.g., geographic data) by using location as the key index variable. Thus, any variable that can be located spatially can be referenced using a GIS. Locations in Earth space-time may be recorded as dates/times of occurrence, and x, y, and z coordinates representing longitude, latitude, and elevation, respectively.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
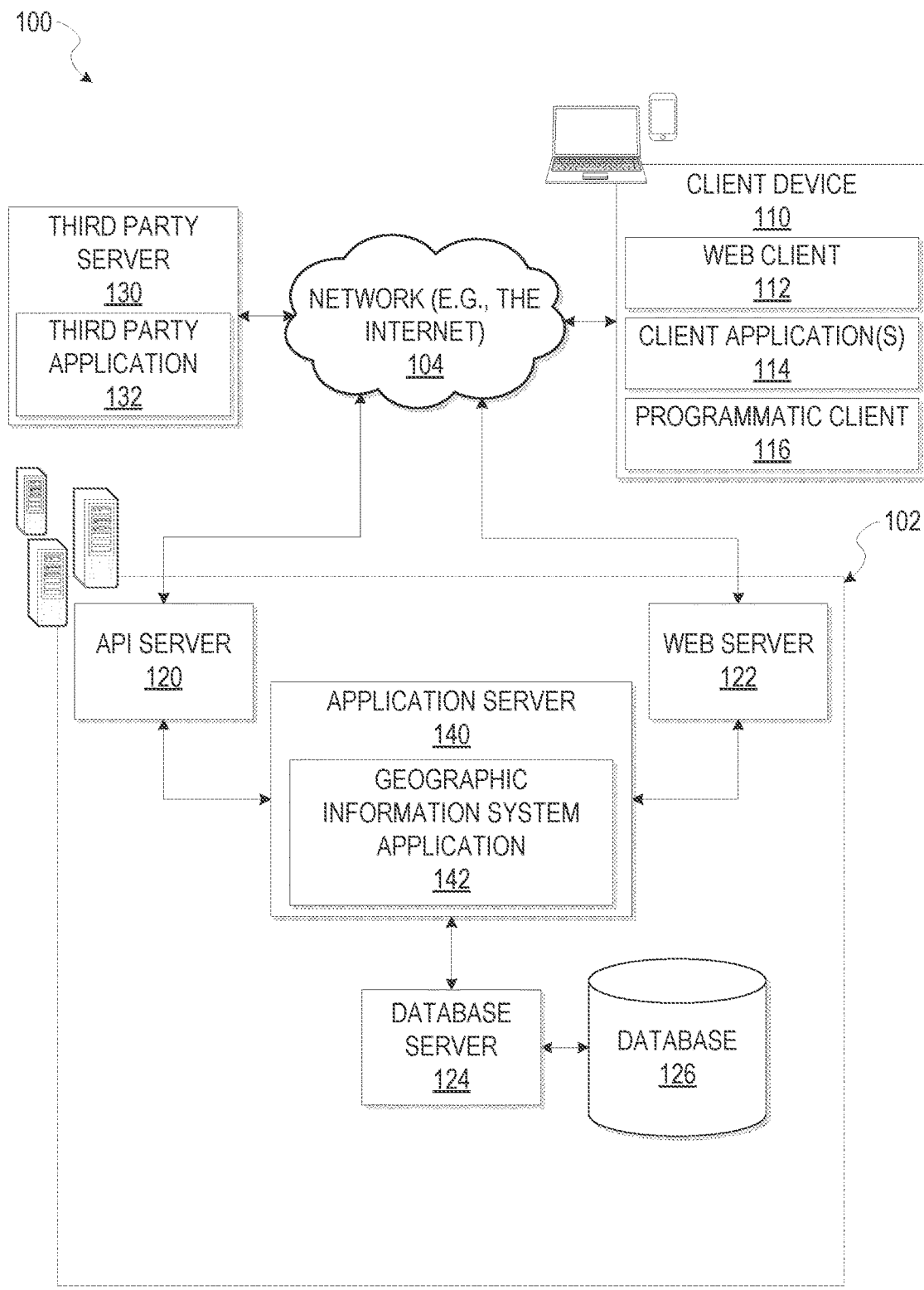
FIG. 1 is a network diagram illustrating a network environment suitable for generating and presenting a tile cache based on geospatial data, according to some example embodiments.

Example embodiments described herein pertain to a geographic information system (GIS) configured to receive geospatial data from a multitude of sources, and use the geospatial data to generate and display a tile cache. The GIS may be or include a group of one or more server machines configured to provide one or more GIS services. A client device may accordingly request and receive, from the GIS, a tile cache based on multiple geospatial data inputs, as well as through geospatial data submitted via scripts or external applications. The GIS may then determine an accurate corresponding projection and coordinate system of the geospatial data based on a user input, and in some example embodiments may apply a transformation to the geospatial data. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The GIS is configured (e.g., by one or more suitable modules that include one or more processors) to obtain geospatial data (e.g., images captured via satellite and aerial sources), determine a projection and coordinate system of the geospatial data based on user inputs and a base map or corresponding metadata (e.g., a default projection and coordinate system), apply transformations to the geospatial data, and generate a tile cache useable by any conventional mapping system, based on at least the geospatial data. A tile cache is a collection of images made from geospatial data, comprising images of the geospatial data at several different scales. For example, based on the source data, and either corresponding metadata (e.g., which includes a projection and coordinate system) or a user input (e.g., defining the projection and coordinate system), a determination may be made regarding what "scales" are needed for the tile cache, and the size of the tiles comprising the tile cache. The GIS may obtain the geospatial data from a third party source, or directly from a client device.

In some example embodiments, the GIS automatically determines a projection and coordinate system of the geospatial data based on corresponding metadata of the geospatial data. Metadata is information about digital data. Numerous metadata standards have been developed in the area of geographic information systems, including at least Federal Geographic Data Committee standard (FGDC), Machine-Readable Cataloging record (MARC), and Dublin Core. For example, the geospatial data may include metadata representing a longitude, latitude, and elevation values useable to determine an appropriate projection and coordinate system to assign to the geospatial data. After obtaining the geospatial data, the GIS checks the metadata of the geospatial data to identify if there are longitude, latitude, and elevation values. If the corresponding metadata includes the coordinate values (e.g., longitude, latitude, and elevation values), the GIS determines and assigns a projection and coordinate system to the geospatial data. If the GIS determines that the corresponding metadata does not include any coordinates usable by the GIS in determining a projection and coordinate system, the GIS causes display of a notification on the client device, prompting the user to provide user inputs useable to identify the projection and coordinate system of the geospatial data.

In instances where the geospatial data has no corresponding longitude, latitude, and elevation values, the GIS determines a projection and coordinate system to assign to the geospatial data based on user input. For example, the GIS is configured to present the geospatial data at a client device, displayed beside a base map, where the geospatial data and the base map both represent a geographic region, and the base map includes a corresponding base-projection and base-coordinate system. The user input may include inputs to "hand georectify" the geospatial data by manually selecting points on the geospatial data and the base map where the selected points represent pairs of matching landmarks. Georectification is the digital alignment of a satellite or aerial image with a map of the same area. In georectification, a number of corresponding control points (e.g., landmarks such as street intersections) are marked on both the image (e.g., the geospatial data) and the map (e.g., the base map). These locations become reference points in the subsequent processing of the image. The GIS determines a projection and coordinate system for the geospatial data based on at least the base-projection and base-coordinate system of the base map and the user inputs identifying the matching pairs of identified points.

According to various example embodiments, the GIS is further configured to apply a transformation to the geospatial data at the server, based on the determined projection and coordinate system. The transformations include: affine transformations (e.g. in order to create a correctly georectified version of the source data); converting between formats (e.g., geotiff to a jpeg); converting the image to other standard projections (e.g., as defined in the European Petroleum Survey Group, for example); changing the transparency and/or color of the data; or generating a composite image based on multiple images (e.g., source data) imported at different projections, such that the composite image is of a single, uniform projection, and transparency. The transformation of the geospatial data aligns the geospatial data with the base map of the same area. For example, the server may distort the geospatial data (e.g., satellite image) in such a way as to put the image in the corresponding spatial projection system of the base map. In some embodiments, the transformation is applied to the geospatial data by a conventional georectification application (e.g., the Geospatial Data Extraction Library). With the transformed (e.g., georectified) geospatial data, the GIS generates a tile cache, where the tile cache is a fraction of the size of the original image.

As an illustrative example from a user perspective, suppose a user launches an application configured to interact with the GIS on a client device, and the application enables the user to submit geospatial data to a server in order to generate a tile cache useable by a conventional mapping system. The GIS application may cause the display of a notification window on the client device, the user identifies an aerial surveillance image (e.g., geospatial data) of a geographic region. The aerial surveillance image may be located within a local storage component of the client device, or a third-party database. The user may use the client device to transmit the aerial surveillance image to a server of the GIS.

Having obtained the aerial surveillance image from the user through the client device or a third-party server, the GIS may then identify, determine, and assign a projection and coordinate system to the aerial surveillance image, in order to apply any necessary transformations to the aerial surveillance image. If the GIS determines that the aerial surveillance image has no associated metadata which identifies a corresponding projection and coordinate system, the GIS obtains a base map of the same geographic region of the geospatial data (e.g., from the client device). The GIS may then display the base map and the aerial surveillance image within a graphical user interface presented on the client device.

The user may then identify matching pairs of landmarks located within the aerial surveillance image and the base map through user inputs on the graphical user interface displayed on the client device. After selecting a minimum number of landmark pairs, the GIS identifies and assigns a projection and coordinate system to the aerial surveillance image. The GIS then applies a transformation to the aerial surveillance image based on the assigned projection and coordinate system.

Having applied a transformation to the aerial surveillance image, the GIS generates a tile cache at the GIS server, and delivers the tile cache to the client device. Additionally, the user may choose to request individual tiles, or to download the entire tile cache. The user may then use the individual tiles, or the entire tile cache within any conventional mapping system to view the surveyed area.

FIG. 1 is a network diagram illustrating a network environment 100 suitable for operating a GIS (e.g., geographic information system application (GIS) 142), according to some example embodiments. A networked system 102, provides server-side functionality, via a network 104 (e.g., an Intranet, the Internet or a Wide Area Network (WAN)), to one or more clients. FIG. 1 illustrates, for example, a web client 112 (e.g. a web browser), client application(s) 114, and a programmatic client 116 executing on respective client device 110. It shall be appreciated that although the various functional components of the system 100 are discussed in the singular sense, multiple instances of one or more of the various functional components may be employed.

An Application Program Interface (API) server 120 and a web server 122 are coupled to, and provide programmatic and web interfaces respectively to, one or more application server 140. The application server(s) 140 host the GIS 142. The application servers 140 are, in turn, shown to be coupled to one or more database servers 124 that facilitate access to one or more databases 126.

The GIS 142 is a server application with a web front-end that obtains geospatial data and allows georectification (e.g., an application of transformations) of the geospatial data and may output the data in various forms for the networked system 102. For example, the GIS 142 may be configured to obtain geospatial data, apply a georectification (e.g., transformation) to the geospatial data, and output a tile cache based on the georectified geospatial data. While the GIS 142 is shown in FIG. 1 to form part of the networked system 102, it will be appreciated that, in alternative embodiments, the GIS 142 may form part of a system that is separate and distinct from the networked system 102.

FIG. 1 also illustrates a third-party application 132, executing on a third-party server 130, as having programmatic access to the networked system 102 via the programmatic interface provided by the API server 120. The third-party server 130 may, for example, be a source of geospatial data useable by the GIS 142.

Figure 2:
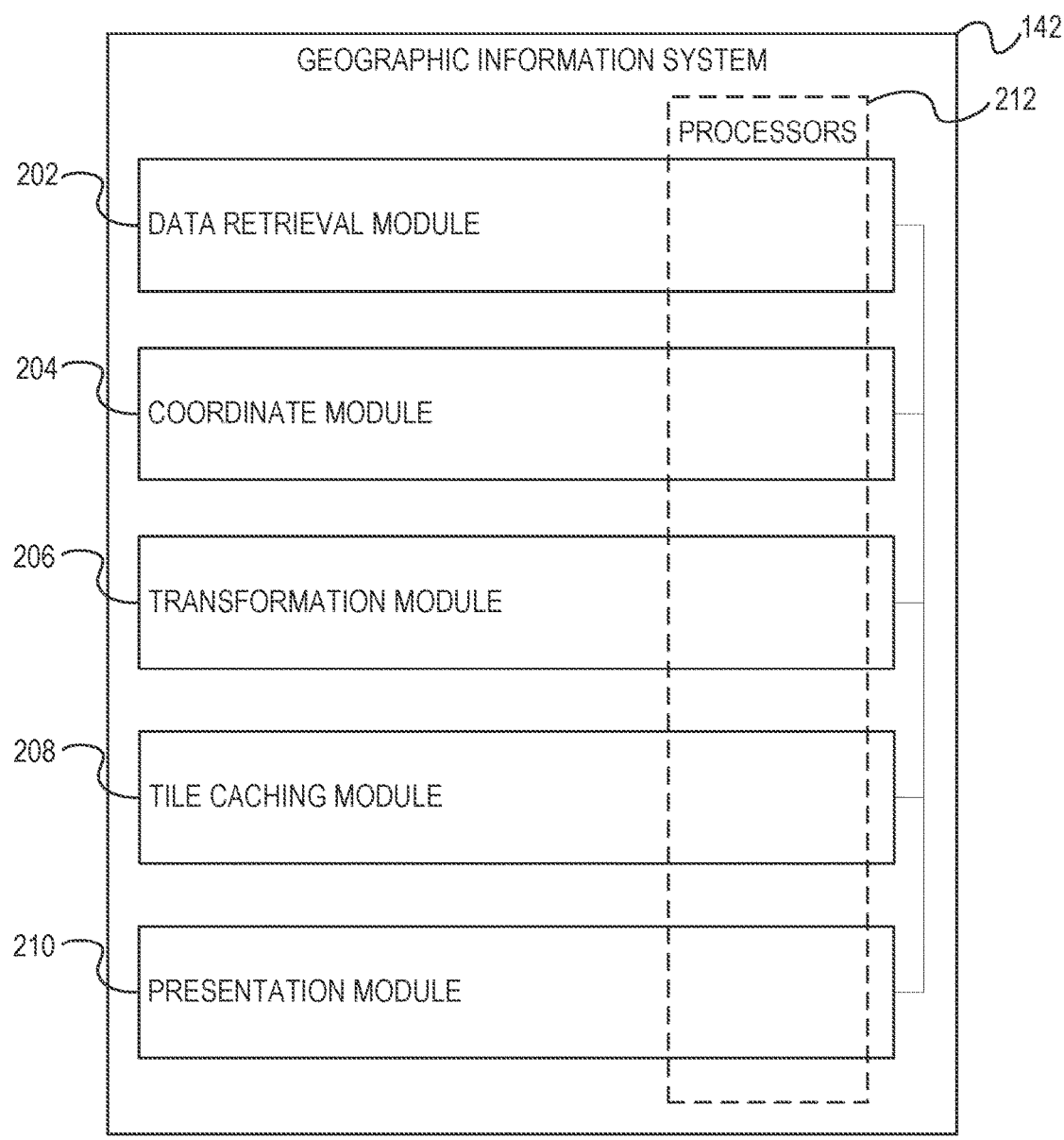
FIG. 2 is a block diagram illustrating components of a geographic information system suitable to receive geospatial data usable to generate and display a tile cache, according to some example embodiments.

FIG. 2 is a block diagram illustrating components of a geographic information system (e.g., the GIS 142) suitable to receive geospatial data, apply transformations, and generate and display a tile cache, according to some example embodiments. As is understood by skilled artisans in the relevant computer and Internet-related arts, each component (e.g., a module or engine) illustrated in FIG. 2 represents a set of executable software instructions and the corresponding hardware (e.g., memory and processor) for executing the instructions. The GIS 142 is shown as including a data retrieval module 202, a coordinate module 204, a transformation module 206, a tile caching module 208, and a presentation module 210, each of which is configured and communicatively coupled to communicate with the other modules (e.g., via a bus, shared memory, or a switch).

Geospatial data is obtained via the data retrieval module 202, from one or more data sources (e.g., the third-party servers 130 or the client device 110). In such instances, the data retrieval module 202 may receive a request to retrieve geospatial data from the third party server 130, or from the client device 110. For example, a user on the client device 110 may submit a request to the GIS 142 to retrieve geospatial data. The request may identify a source of the geospatial data at either the third-party server 130, or from a location in client device 110. Responsive to receiving the request the data retrieval module 202 retrieves the geospatial data for the GIS 142 from the identified data source.

After obtaining the geospatial data, the data retrieval module 202 provides the geospatial data to the coordinate module 204. The coordinate module 204 is configured to determine a projection and coordinate system of the geospatial data. In some example embodiments, the coordinate module 204 determines a projection and coordinate system based on corresponding metadata of the geospatial data. For example, the geospatial metadata may include coordinate values representing longitude, latitude, and elevation. Based on the coordinate values, the coordinate module 204 determines and assigns a projection and coordinate system to the geospatial data.

In instances where the geospatial data has no corresponding metadata, the coordinate module 204 determines a projection and coordinate system of the geospatial data based on user input. For example, the coordinate module 204 may receive user input from the client device 110 identifying matching pairs of landmarks on the geospatial data and a base map, where the base map represents the same geographic area as the geospatial data. The user inputs may, for example, include sets of points which represent matching landmark pairs located within the geospatial data and the base map. With the sets of points, the coordinate module 204 may determine and assign a projection and coordinate system to the geospatial data.

The transformation module 206 is configured to georectify (e.g., apply a transformation) the geospatial data based the projection and coordinate system determined by the coordinate module 204. The transformation module 206 applies a transformation to the geospatial data. The transformation converts the coordinate system in the geospatial data to another coordinate system (e.g., the coordinate system of the base map). The transformation includes distortions applied to the geospatial data.

The tile caching module 208 is configured to obtain the transformed geospatial data with corresponding projection and coordinate system, and generate a tile cache based on the transformed geospatial data. In a tile cache, the geospatial data is tiled so that the geospatial data may be represented as a set of polygonal tiles. Tiling geospatial data breaks the geospatial data into a manageable rectangular set, or rows and columns of pixels, typically used to process a large amount of data without consuming vast quantities of computer memory. Thus, by tiling the geospatial data in order to generate a tile cache of the geospatial data, the GIS 142 enables a user to process a large amount of geospatial data without consuming large quantities of computer memory.

The presentation module 210 is configured to present a graphical user interface on the client device 110, where the graphical user interface includes at least a presentation of the geospatial data. In other example embodiments, the presentation module 210 also causes the display of a base map and the generated tile cache to the client device 110.

Any one or more of the modules described may be implemented using hardware alone (e.g., one or more of the processors 212 of a machine) or a combination of hardware and software. For example, any module described of the GIS 142 may physically include an arrangement of one or more of the processors 212 (e.g., a subset of or among the one or more processors 212 of the machine) configured to perform the operations described herein for that module. As another example, any module of the GIS 142 may include software, hardware, or both, that configures an arrangement of one or more processors 212 (e.g., among the one or more processors 212 of the machine) to perform the operations described herein for that module. Accordingly, different modules of the GIS 142 may include and configure different arrangements of such processors 212 or a single arrangement of such processors 212 at different points in time. Moreover, any two or more modules of the GIS 142 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
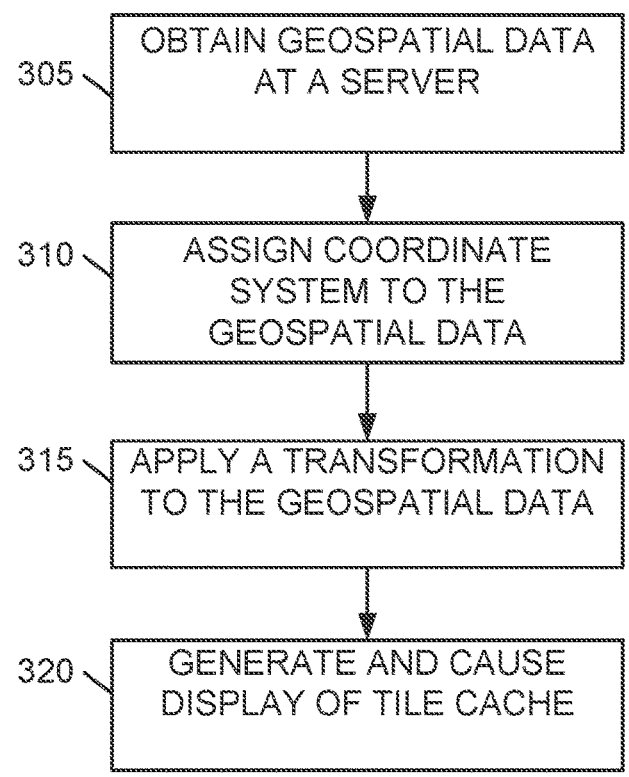
FIG. 3 is a flowchart illustrating operations of the geographic information system in performing a method of obtaining geospatial data in order to generate and display a tile cache, according to some example embodiments.

FIG. 3 is a flowchart illustrating operations of the GIS 142 in performing a method 300 of obtaining geospatial data in order to generate a tile cache, according to some example embodiments. The method 300 may be embodied in computer-readable instructions for execution by one or more processors such that the steps of the method 300 may be performed in part or in whole by the components of the GIS 142; accordingly, the method 300 is described below by way of example with reference thereto. However, it shall be appreciated that the method 300 may be deployed on various other hardware configurations and is not intended to be limited to the GIS 142.

At operation 305, the data retrieval module 202 obtains geospatial data. In some example embodiments the GIS 142 retrieves geospatial data responsive to a request from the client device 110. For example, a user on the client device 110 may provide the GIS 142 with geospatial data directly, or alternatively may identify a source of the geospatial data on a third-party server 130 or a database server 124. The geospatial data represents a geographic region, and may include corresponding metadata.

At operation 310, the coordinate module 204 assigns a projection and coordinate system of the geospatial data. In instances in which the metadata includes coordinate values of the longitude, latitude, and elevation of the geospatial data, the coordinate module 204 determines the projection and coordinate system using the metadata of the geospatial data. Example operations for carrying out operation 310 in scenarios in which the metadata of the geospatial data is not useable in determining a projection and coordinate system are discussed below in reference to FIG. 4 and FIG. 5.

At operation 315, the transformation module 206 georectifies (e.g., applies a transformation) the geospatial data based on at least the determined projection and coordinate system. Georectification takes an image (e.g., the geospatial data) that has not been adjusted to be in a known coordinate system, and through applied transformations, puts the image into a known coordinate system. As discussed above, a projection and coordinate system may be determined by identifying sets of matching points between the image (e.g., the geospatial data), and a base map which includes a known projection and coordinate system. The transformation includes rotation, distortion, and scaling of the geospatial data.

At operation 320, the tile caching module 208 generates a tile cache based on the transformed geospatial data. As discussed above, a tile cache is a representation of the geospatial data. In a tile cache, the geospatial data is represented as a set of polygonal tiles, or polyhedral blocks, such that no figures overlap and there are no gaps. The tile caching module 208 generates a tile cache based on at least the transformed geospatial data.

In some example embodiments, the GIS 142 assigns a timestamp to the tile cache. The timestamp indicates a time and date when the geospatial data was first obtained. For example, the GIS 142 may obtain the time and date that the data was obtained by checking the metadata of the geospatial data. In some embodiments, a user may provide a timestamp to the GIS 142 to be assigned to the geospatial data. By assigning timestamps to the geospatial data, the GIS 142 may enable a user to compare imagery taken on different dates in order to see any changes that may have occurred (e.g., pre-and-post-disaster imagery). Additionally, the user may retrieve a tile cache from among one or more tile caches the user previous created, based on a user query which includes one or more criteria including a particular time or projection system. Thus, in this way, a user may view the most recent tile cache based on a query.

Figure 4:
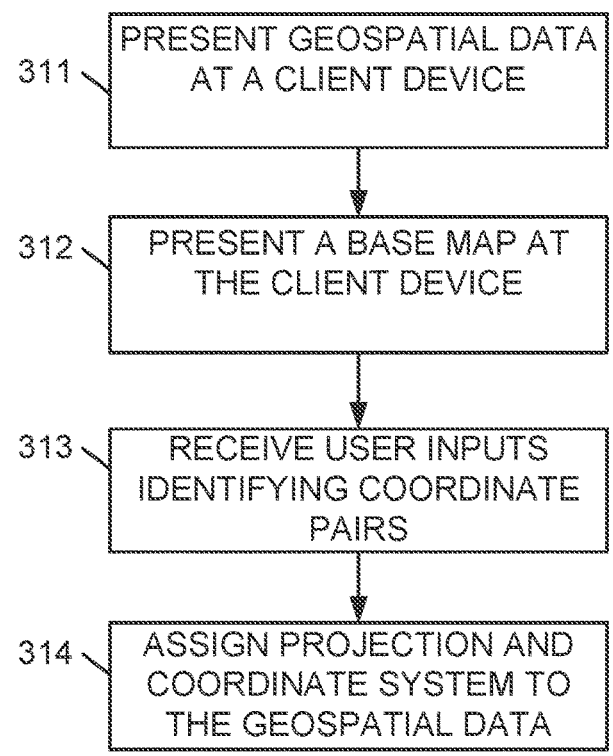
FIG. 4 is a flowchart illustrating operations of the geographic information system in performing a method for determining and assigning a projection and coordinate system to the obtained geospatial data, according to some example embodiments.

As shown in FIG. 4, one or more operations 311, 312, 313, and 314 may be performed as part (e.g., a precursor task, a subroutine, or portion) of operation 310 of method 300, in which the coordinate module 204 determines and assigns a projection and coordinate system to geospatial data, according to some example embodiments. FIG. 4 depicts a scenario when the geospatial data lacks useful corresponding metadata (e.g., longitude, latitude, or elevation values).

Operation 311 may be performed by the presentation module 210. The presentation module 210 causes presentation of a graphical user interface including a display of a graphical representation of the geospatial data on the client device 110. The geospatial data may be of a file format that does not include metadata useable to determine a projection and coordinate system of the geospatial data. In some example embodiments the graphical user interface may include a file retrieval or entry field, enabling the user to upload or select geospatial data to be displayed in the graphical user interface at the client device 110. For example, the user may upload geospatial data (e.g., a surveillance image from a drone) representative of a geographic region to the application servers 140 to be accessed by the GIS 142.

At operation 312, the coordinate module 204 presents base map data (e.g., from database 126) of the geographic region represented by the geospatial data selected by the user in the graphical user interface. The base map includes a corresponding base-projection and base-coordinate system, useable by the coordinate module 204 to determine and assign a projection and coordinate system to the geospatial data. In some example embodiments, the base map may be selected manually by the user via the graphical user interface on client device 110. A user may search for a base map based on at least some of search criteria and the geospatial data. The GIS 142 may cause presentation of a set of base maps in the graphical user interface for the user to select a base map from.

In some example embodiments, the coordinate module 204 is further configured to automatically identify a base map based on at least the geospatial data submitted by the user. As an example, the geospatial data may include a presentation of landmarks and features of a geographic region, and based on the locations of the landmarks and features relative to one another, the coordinate module 204 may search for and retrieve a set of base maps with similar landmarks and features. The presentation module 210 causes presentation of the set of base maps on the client device, along with a set of graphical elements that allow the user to select an appropriate base map.

At operation 313, the coordinate module 204 receives user inputs identifying landmark pairs (e.g., coordinate pairs) on the geospatial data and the base map. The presentation module 210 may present the base map and the geospatial data side by side in the graphical user interface. The user may then select one or more pairs of matching landmarks visible on the geospatial data and the base map. The geospatial data may include a presentation of a geographic region. The base map therefore includes a presentation of the same geographic region. The user may place markers (e.g., pins, flags, poles, or indicators) at corresponding locations on the geospatial data and the base map. For example, both the base map and the geographic data may include a presentation of a portion of a city with streets and intersections, and the user may place a marker at an intersection visible in the geospatial data, and then place a marker at the same intersection visible in the base map. In some example embodiments, the coordinate module 204 requires a predetermined number of landmark pairs in order to determine a projection and coordinate system of the geospatial data. For example, the coordinate module 204 may require that the user provide at least three landmark pairs.

At operation 314, the coordinate module 204 determines a projection and coordinate system of the geospatial data based on at least the user inputs and the base map.

Figure 5:
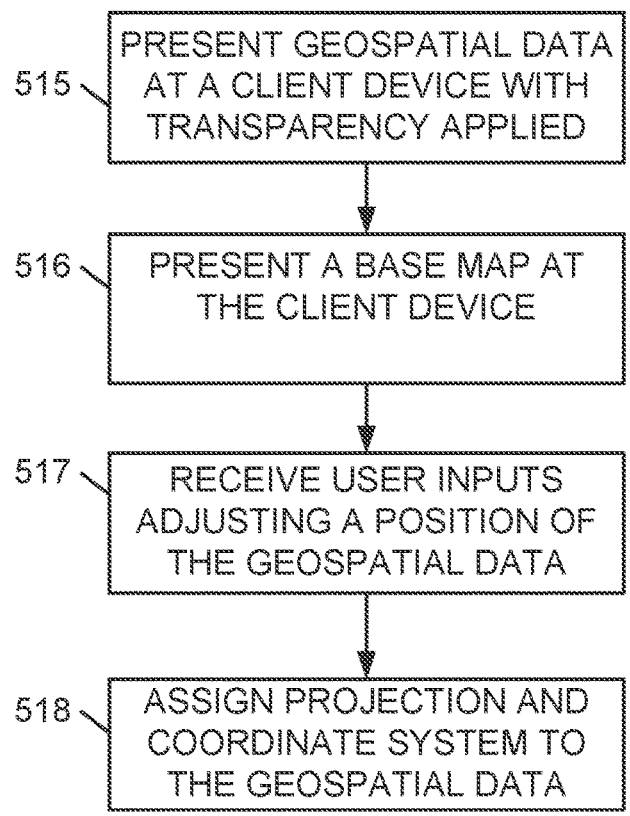
FIG. 5 is a flowchart illustrating operations of the geographic information system in performing a method for determining and assigning a projection and coordinate system to the obtained geospatial data, according to some example embodiments.

As show in FIG. 5, one or more operations 515, 516, 517, and 518 may be performed as an alternative part (e.g., a precursor task, a subroutine, or portion) of operation 310 of method 300, in which the coordinate module 204 determines and assigns a projection and coordinate system to geospatial data, according to some example embodiments. FIG. 5 depicts a scenario when the geospatial data lacks useful corresponding metadata (e.g., longitude, latitude, or elevation values).

Operation 515 may be performed by the presentation module 210. A user accessing the GIS 142 via the client device 110, is presented with a graphical user interface including a display of the geospatial data on the client device 110. In some example embodiments, the geospatial data may be transparently overlaid over a base map.

At operation 516, as in operation 312 of FIG. 4, the coordinate module 204 retrieves and presents a base map (e.g., from database 126) of the geographic region represented by the geospatial data selected by the user in the graphical user interface. The base map includes a corresponding base-projection and base-coordinate system, useable by the coordinate module 204 as reference values to determine and assign a projection and coordinate system to the geospatial data.

In some example embodiments, the presentation module 210 displays the geospatial data with transparency in the graphical user interface along with the base map. At operation 517, the coordinate module 204 receives user inputs adjusting a position of the geospatial data in the graphical user interface to align the geospatial data with the base map. For example, the user may adjust the position of the geospatial data in the graphical user interface so that the landmarks of the geospatial data line up with the matching landmarks of the base map. The presentation module 210 may be configured to receive user inputs from the client device 110 that scale the size of the geospatial data, and adjust the position of the geospatial data in the graphical user interface.

At operation 518, the coordinate module 204 determines a projection and coordinate system of the geospatial data based on at least the position of the geospatial data in the graphical user interface relative to the base map, and the base-project and base-coordinate system of the base map.

Figure 6:
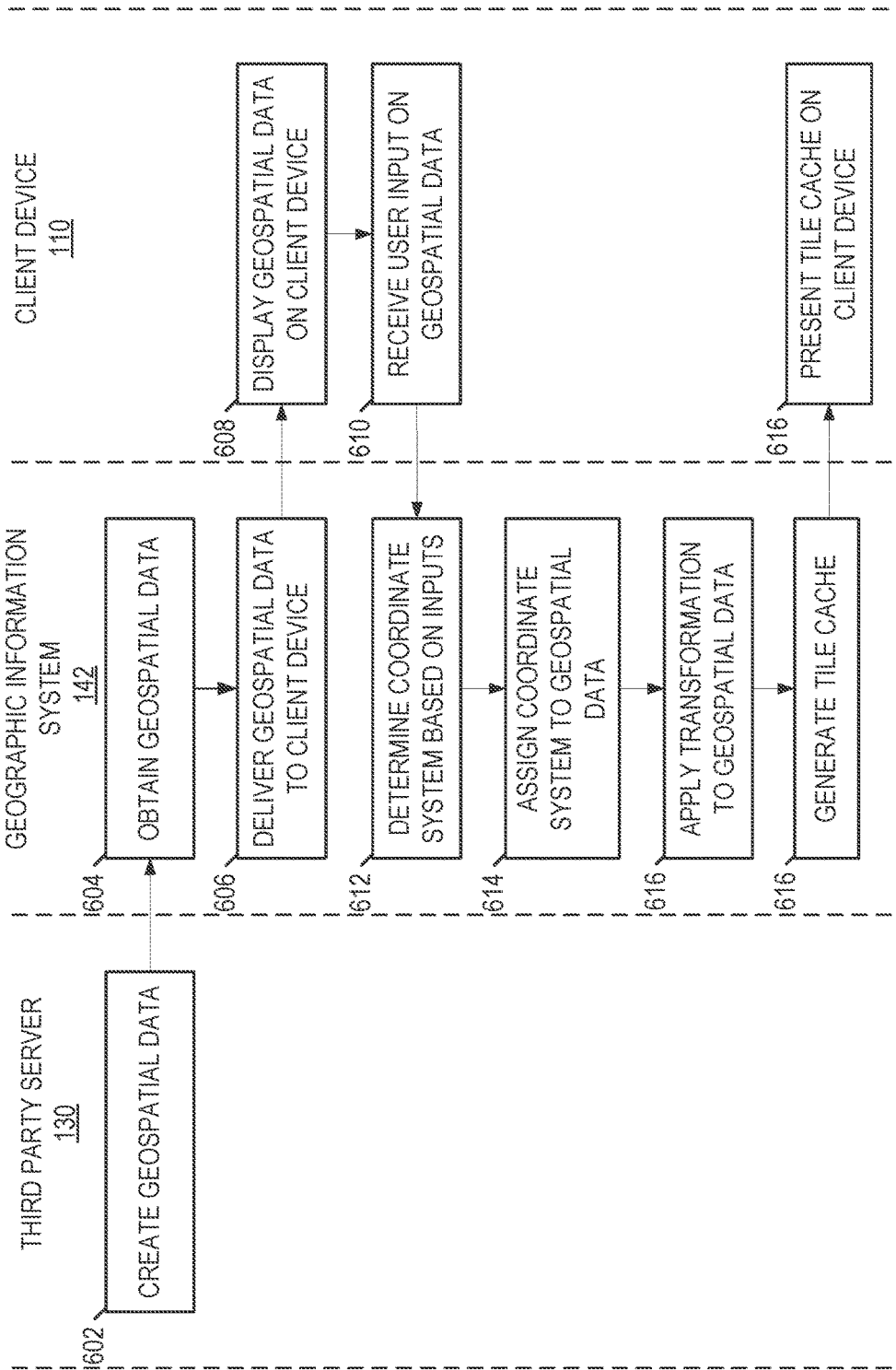
FIG. 6 is an interaction diagram illustrating various example interactions between the geographic information system, third party servers, and a client device, according to some example embodiments.

FIG. 6 is an interaction diagram depicting example exchanges between the GIS 142, third-party servers 130, and client device 110, consistent with some example embodiments. At operation 602, geospatial data is generated (e.g., via aerial surveillance or a satellite) and stored in the third-party servers 130. For example, a surveillance drone may take a set of high resolution images and transmit the images to the third-party server 130.

At operation 604, the GIS 142 obtains the geospatial data from the third-party server 130. In some example embodiments, the GIS 142 may obtain the geospatial data responsive to receiving a request for the client device 110 via the data retrieval module 202. For example, the request may identify a source for the geospatial data, and an identifier of the geospatial data. The data retrieval module 202 may then retrieve the geospatial data based on at least the identified source and identifier of the geospatial data.

At operation 606, the presentation module 210 of the GIS 142 causes the client device 110 to display the geospatial data. At operation 608, the geospatial data is displayed on the client device 110. In some example embodiments, the presentation module 210 may also display a graphical user interface on the client device 110. The graphical user interface includes a presentation of the geospatial data. At operation 610, the client device 110 receives one or more user inputs on the geospatial data, the one or more user inputs useable by the GIS 142 to determine a projection and coordinate system of the geospatial data.

At operation 612, the GIS 142 determines a projection and coordinate system of the geospatial data based on at least the one or more user inputs received via the client device 110. In some example embodiments, the coordinate module 204 may also check the geospatial data for corresponding metadata which may include coordinate values for longitude, latitude, and elevation. At operation 614, having determined an appropriate projection and coordinate system to apply to the geospatial data, the coordinate module 204 assigns the projection and coordinate system to the geospatial data.

At operation 616, the transformation module 206 of the GIS 142 georectifies (e.g., applies a transformation) the geospatial data based on at least the assigned projection and coordinate system. After applying appropriate transformations to the geospatial data, the tile caching module 208 of the GIS 142 generates a tile cache. At operation 616, the tile cache is presented on the client device 110.

Figure 7:
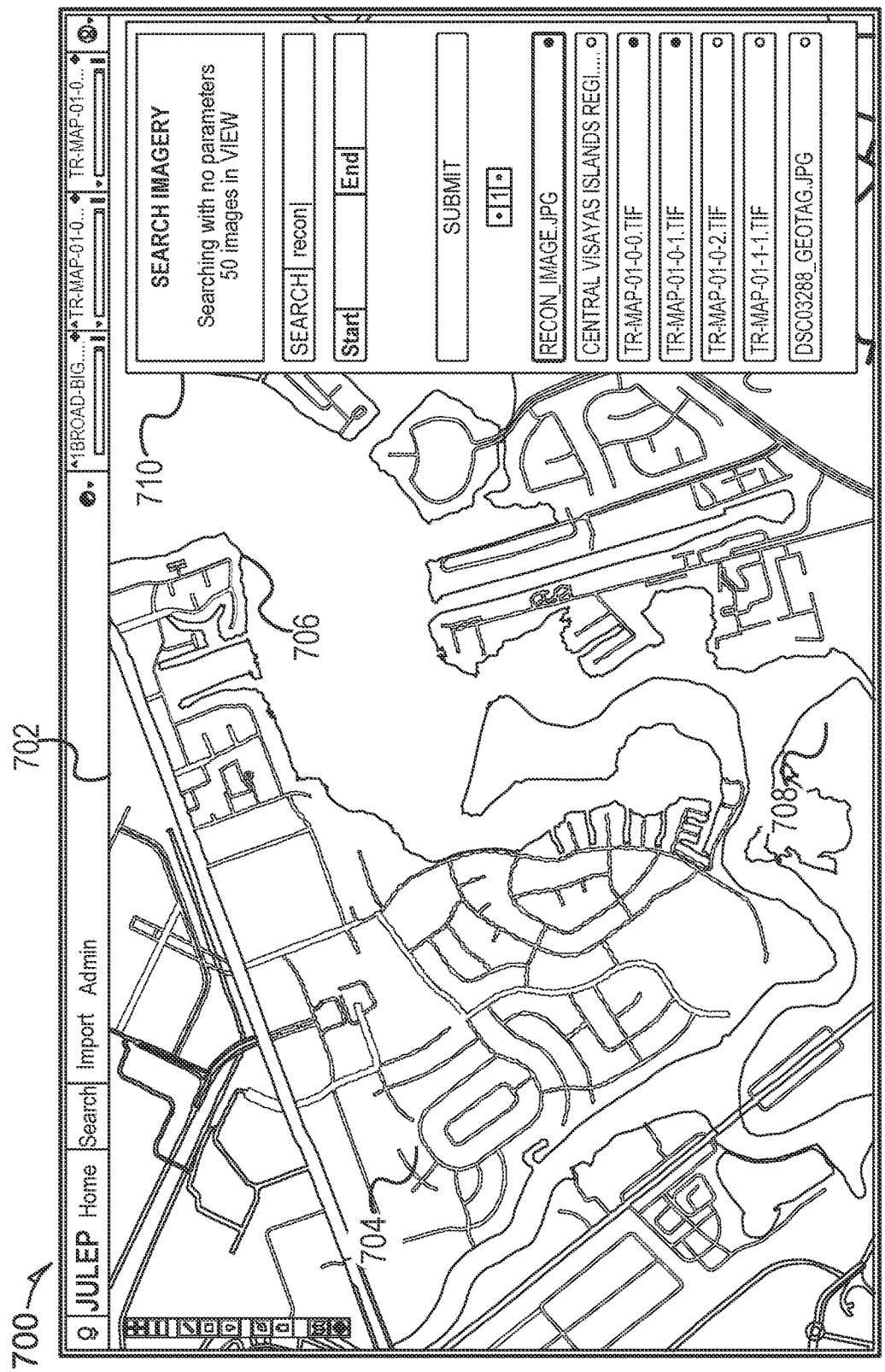
FIG. 7 is a diagram illustrating a user interface for presenting a geospatial data usable by the geographic information system to generate and display a tile cache, according to some example embodiments.

FIG. 7 is a diagram illustrating a user interface (e.g., GIS interface 700) for presenting geospatial data 702 usable by the GIS 142 to generate and display a tile cache, according to some example embodiments. The GIS interface 700 is shown to include an imagery search field 710, configured to enable a user to search for, select, retrieve, and upload images (e.g., geospatial data 702) into the GIS 142. The geospatial data 702 is usable by the GIS 142 to generate and cause the display of a tile cache, according to some example embodiments. The geospatial data 702 may include a single image, or multiple images (e.g., captured by an aerial surveillance drone or satellite) depicting a geographic region. The geospatial data 702 may further include representations of unique landmarks and features (e.g., 704, 706, and 708).

In some example embodiments, the geospatial data 702 include a high-resolution image obtained via aerial surveillance (e.g., drone, helicopter, airplane, satellite) and may be transmitted to a server accessible by the GIS 142 (e.g., the third-party server 130, the database server 124). In further embodiments, the geospatial data may be received by a client device 110, and uploaded into a server accessible by the GIS 142 via the GIS interface 700. In further embodiments, the geospatial data 702 may reside on the client device 110, and may be uploaded to the servers (e.g., database servers 124) of the GIS 142.

A user accessing the GIS 142 on a client device 110 is presented with the GIS interface 700, including the imagery search field 710. The user may provide the imagery search field 710 with search criteria (e.g., a file name, file source) in order to retrieve one or more images and data to be uploaded into the GIS 142, and to generate an present a tile cache based on the uploaded image (e.g., geospatial data 702).

Figure 8:
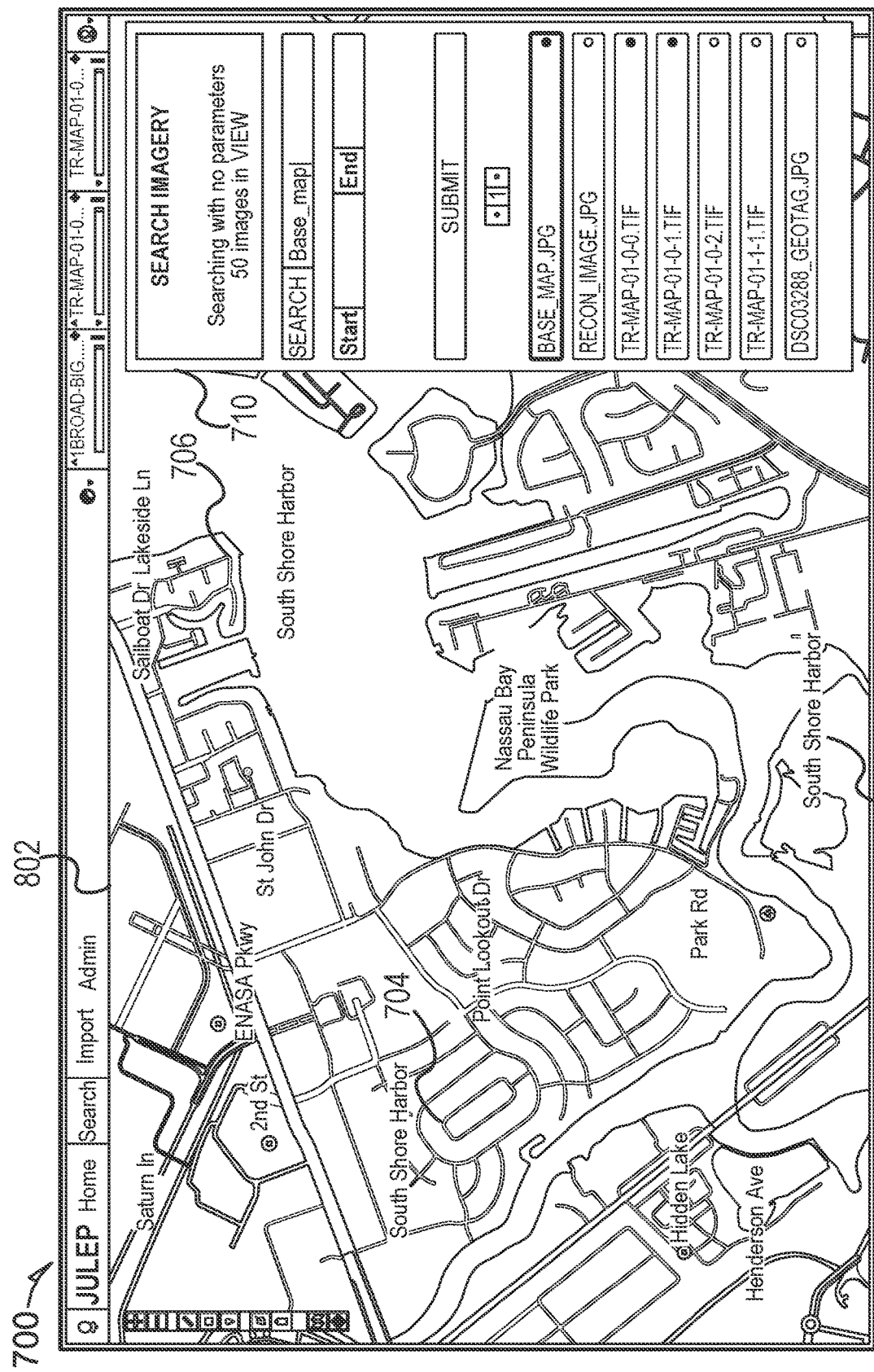
FIG. 8 is a diagram illustrating a user interface for presenting a base map usable by the geographic information system as a reference to determine a projection and coordinate system to apply to the obtained geospatial data, according to some example embodiments.

FIG. 8 is a diagram illustrating the GIS interface 700 displaying a base map 802 of the geographic region represented by geospatial data (e.g., geospatial data 702). The coordinate module 204 of the GIS 142 uses the base map 802 to determine a projection and coordinate system of the geospatial data (e.g., geospatial data 702). The base map 802 includes metadata (e.g., FGDC, MARC, Dublin Core) useable by the coordinate module 204 to determine a projection and coordinate system of the geospatial data 702, as described in the operations of FIG. 3 above. For example, the corresponding metadata may include information defining coordinates of the base map 802 (e.g., longitude, latitude, and elevation) that may be used by the coordinate module 204 to determine and assign a projection and coordinate system to the base map 802.

In some example embodiments, the GIS 142 may retrieve the base map 802 in response to a user uploading geospatial data (e.g., the geospatial data 702). The GIS 142 may search for a base map (e.g., the base map 802) based on the locations of one or more landmarks (e.g., 704, 706, and 708) within the geospatial data (e.g., geospatial data 702), or a set of coordinates corresponding to the geographic region represented by the geospatial data 702. Upon identifying a base map (e.g., the base map 802) based on at least coordinates or the locations of the one or more landmarks (e.g., 704, 706, and 708), the GIS 142 causes display of the base map 802 on the client device 110.

In further embodiments, a user may simply retrieve and upload the base map 802 into the GIS 142 via the imagery search field 710 by providing the imagery search field 710 with a file name and file location of the base map 802. The base map 802 may reside within a server remote from the GIS 142 (e.g., third-party server 130), or within the client device 110. The GIS 142 may retrieve the base map 802 responsive to a command from the client device 110. In some embodiments, the GIS 142 may retain a set of base maps, including base map 802, within a local server (e.g., database server 124), and access the base map 802 responsive to a command from the client device 110 identifying the base map 802.

Figure 9:
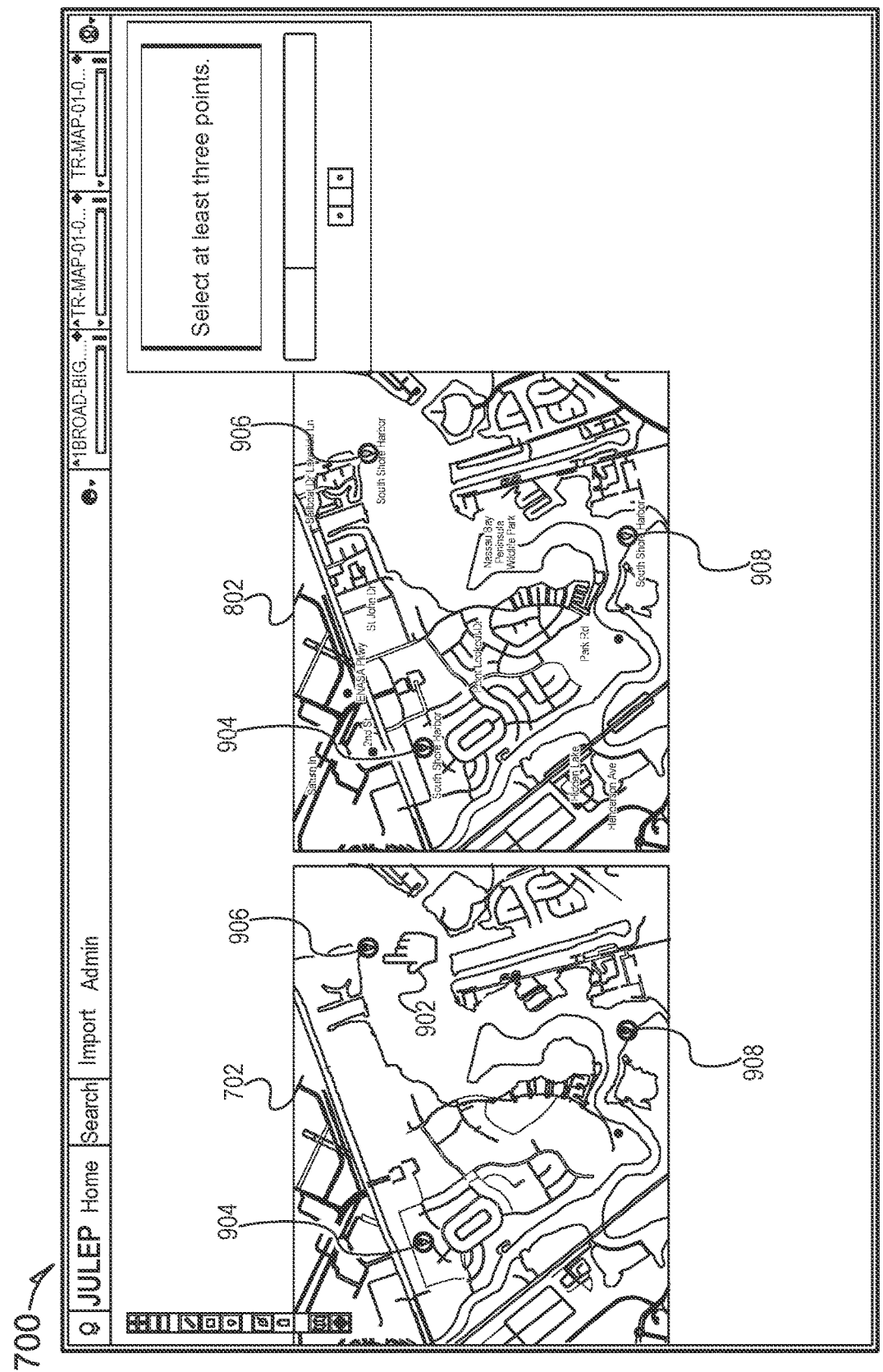
FIG. 9 is a diagram illustrating a user interface configured to receive user inputs defining common landmarks of the geospatial data and the base map in order to determine a projection and coordinate system, according to some example embodiments.

FIG. 9 is a diagram illustrating the GIS interface 700 including a presentation of the geospatial data 702 and the base map 802, configured to receive one or more user inputs 904, 906, and 908 identifying matching landmark pairs between geospatial data (e.g., the geospatial data 702), and base map (e.g., the base map 802). Thus, a user on a client device 110 may provide the GIS interface 700 with inputs (e.g., inputs 904, 906, and 908) via a cursor 902, identifying matching landmark pairs (e.g., 704, 706, and 708) between the geospatial data 702 and the base map 802.

Figure 10:
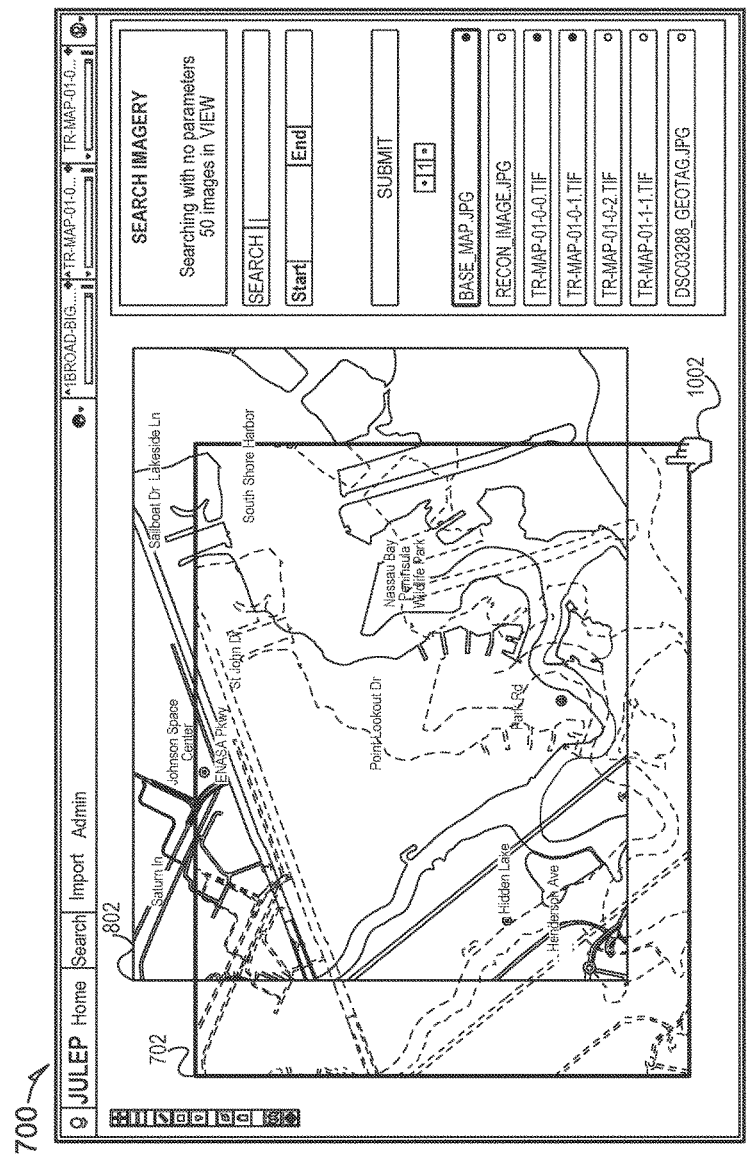
FIG. 10 is a diagram illustrating a user interface configured to receive user inputs adjusting a position of the geospatial data in relative to the base map in order to determine a projection and coordinate system, according to some example embodiments.

FIG. 10 is a diagram illustrating the GIS interface 700, generated by the presentation module 210, configured to receive a user input aligning geospatial data (e.g., geospatial data 702) with a base map (e.g., the base map 802), according to some example embodiments. For example, the base map 802 may include a corresponding projection and coordinate system. A user manipulating a cursor 1002 may align the geospatial data 702 with the base map 802, such that the landmarks of the geospatial data 702 occupy the same location in the GIS interface 700 as the corresponding landmarks of the base map 802. In response, the coordinate module 204 may determine and apply the projection and coordinate system of the base map 802 to the geospatial data 702, thus enabling the transformation module 206 to apply a transformation to the geospatial data 702.

Figure 11:
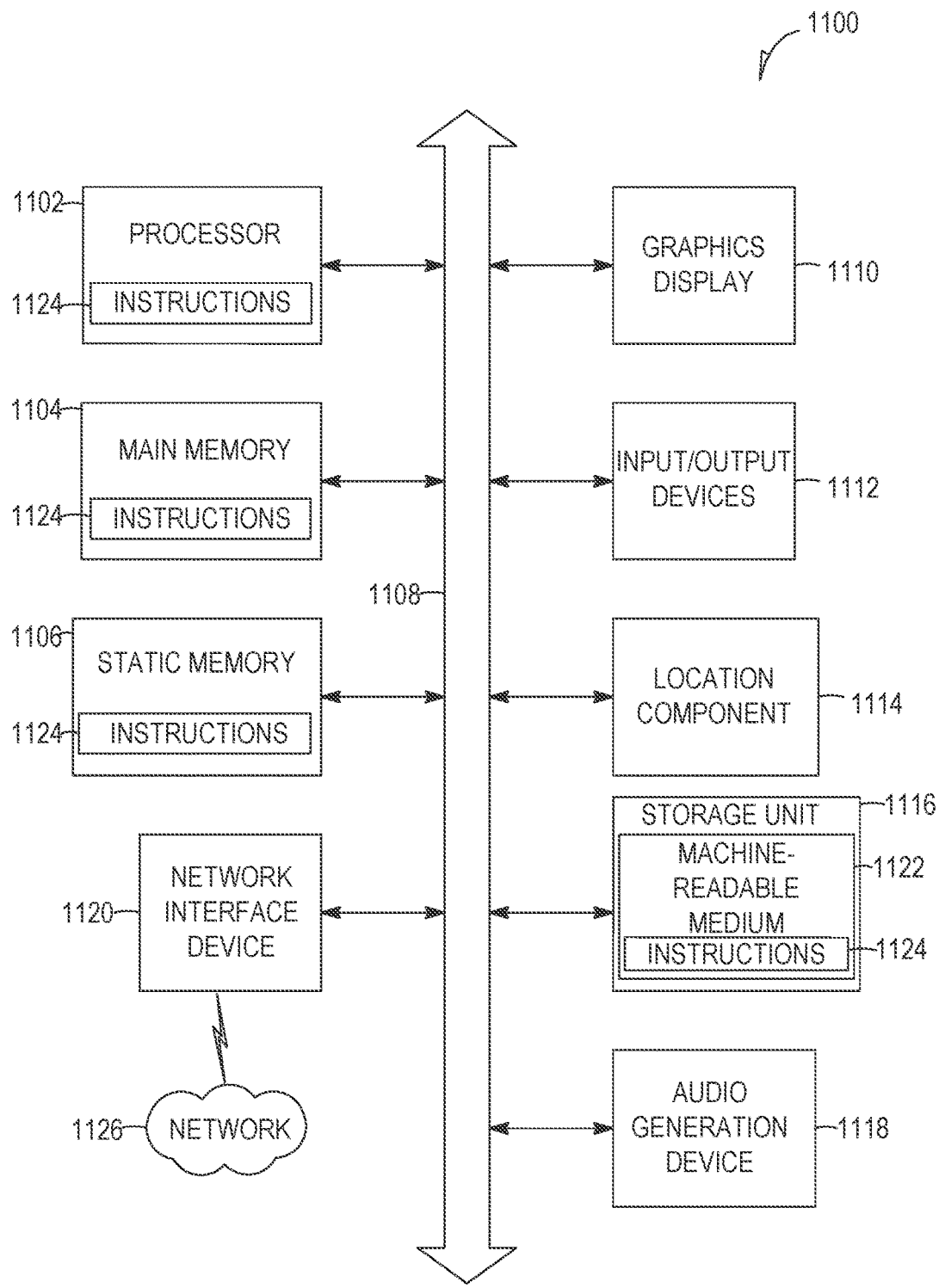
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be communicatively coupled (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a PC, a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain solid-state digital microcircuits (e.g., electronic, optical, or both) that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein. In some example embodiments, the processor 1102 is a multicore CPU (e.g., a dual-core CPU, a quad-core CPU, or a 128-core CPU) within which each of multiple cores is a separate processor that is able to perform any one or more of the methodologies discussed herein, in whole or in part. Although the beneficial effects described herein may be provided by the machine 1100 with at least the processor 1102, these same effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an input/output device 1112 (e.g., a keyboard or keypad, a mouse, or a trackpad), a storage unit 1116, an audio generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), within the static memory 1106, or all three, before or during execution thereof by the machine 1100. Accordingly, the main memory 1104 and the processor 1102 may be considered machine-readable media (e.g., tangible and non-transitory machine-readable media). The instructions 1124 may be transmitted or received over a network 1126 via the network interface device 1120. For example, the network interface device 1120 may communicate the instructions 1124 using any one or more transfer protocols (e.g., hypertext transfer protocol (HTTP)).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store the instructions 1124. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1124 for execution by the machine 1100 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1124).

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving geospatial data at a server, the geospatial data identifying a geographic area that includes a first depiction of one or more landmarks, the one or more landmarks represented in the geospatial data by location data that defines locations of the one or more landmarks within the geographic area;
   retrieving a base map based on the one or more landmarks depicted within the geospatial data, the base map including a second depiction of the one or more landmarks and corresponds to the geographic area identified by the geospatial data based on the location data of the one or more landmarks, the base map having a projection and coordinate system;
   assigning, by one or more processors, the projection and coordinate system of the base map to the geospatial data;
   applying a transformation to the geospatial data based on the projection and coordinate system, the transformation aligning the first depiction of the one or more landmarks of the geospatial data to the second depiction of the one or more landmarks of the base map;
   generating a tile cache based on the transformed geospatial data, the tile cache including the projection and coordinate system; and
   causing display of a presentation of the geographic area based on the tile cache.

2. The method of claim 1, wherein the assigning the projection and coordinate system to the geospatial data by the one or more processors includes:
   overlaying the geospatial data at a position on top of the base map;
   changing a transparency of the geospatial data such that the base map is visible through the geospatial data; and
   aligning the position of the geospatial data to align the first depiction of the one or more landmarks of the geospatial data with the second depiction of the one or more landmarks of the base map.

3. The method of claim 1, wherein the assigning the projection and coordinate system to the geospatial data by the one or more processors includes:
   overlaying the geospatial data at a position on top of the base map;
   changing a transparency of the geospatial data such that the base map is visible through the geospatial data; and
   scaling the geospatial data to align the first depiction of the one or more landmarks of the geospatial data with the second depiction of the one or more landmarks of the base map.

4. The method of claim 1, wherein the assigning the projection and coordinate system to the geospatial data by the one or more processors includes:
   overlaying the geospatial data at a position on top of the base map;
   changing a transparency of the geospatial data such that the base map is visible through the geospatial data; and
   rotating the geospatial data to align the first depiction of the one or more landmarks of the geospatial data with the second depiction of the one or more landmarks of the base map.

5. The method of claim 1, wherein the geospatial data is in a first file format, the base map is a second file format, and wherein the applying the transformation includes:
   converting the geospatial data from the first file format to the second file format.

6. The method of claim 1, wherein the receiving the geospatial data includes receiving a timestamp that indicates a time that the geospatial data was gathered, and wherein the method further comprises:

assigning the timestamp to the tile cache.

7. The method of claim 1, wherein the receiving the geospatial data includes:

receiving a request from a client device to retrieve geospatial data from a third party server;

accessing the third party server to retrieve the geospatial data.

8. A system, comprising:

processors; and a memory storing instructions that, when executed by at least one processor among the processors, causes the system to perform operations comprising:

receiving geospatial data at a server, the geospatial data identifying a geographic area that includes a first depiction of one or more landmarks, the one or more landmarks represented in the geospatial data by location data that defines locations of the one or more landmarks within the geographic area;

retrieving a base map based on the one or more landmarks depicted within the geospatial data, the base map including a second depiction of the one or more landmarks and corresponds to the geographic area identified by the geospatial data based on the location data of the one or more landmarks, the base map having a projection and coordinate system;

assigning the projection and coordinate system of the base map to the geospatial data;

applying a transformation to the geospatial data based on the projection and coordinate system, the transformation aligning the first depiction of the one or more landmarks of the geospatial data to the second depiction of the one or more landmarks of the base map;

generating a tile cache based on the transformed geospatial data, the tile cache including the projection and coordinate system; and causing display of a presentation of the geographic area based on the tile cache.

9. The system of claim 8, wherein the assigning the projection and coordinate system to the geospatial data includes:

overlaying the geospatial data at a position on top of the base map;

changing a transparency of the geospatial data such that the base map is visible through the geospatial data; and aligning the position of the geospatial data to align the first depiction of the one or more landmarks of the geospatial data with the second depiction of the one or more landmarks of the base map.

10. The system of claim 8, wherein the assigning the projection and coordinate system to the geospatial data includes:

overlaying the geospatial data at a position on top of the base map;

changing a transparency of the geospatial data such that the base map is visible through the geospatial data; and scaling the geospatial data to align the first depiction of the one or more landmarks of the geospatial data with the second depiction of the one or more landmarks of the base map.

11. The system of claim 8, wherein the assigning the projection and coordinate system to the geospatial data includes:

overlaying the geospatial data at a position on top of the base map;

changing a transparency of the geospatial data such that the base map is visible through the geospatial data; and rotating the geospatial data to align the first depiction of the one or more landmarks of the geospatial data with the second depiction of the one or more landmarks of the base map.

12. The system of claim 8, wherein the geospatial data is in a first file format, the base map is a second file format, and wherein the applying the transformation includes:

converting the geospatial data from the first file format to the second file format.

13. The system of claim 8, wherein the receiving the geospatial data includes receiving a timestamp that indicates a time that the geospatial data was gathered, and wherein the operations further comprises:

assigning the timestamp to the tile cache.

14. The system of claim 8, wherein the receiving the geospatial data includes:

receiving a request from a client device to retrieve geospatial data from a third party server;

accessing the third party server to retrieve the geospatial data.

15. A non-transitory computer-readable storage medium storing a set of instructions that, when executed by one or more processors of a machine, cause the machine to perform operations comprising:

receiving geospatial data at a server, the geospatial data identifying a geographic area that includes a first depiction of one or more landmarks, the one or more landmarks represented in the geospatial data by location data that defines locations of the one or more landmarks within the geographic area;

retrieving a base map based on the one or more landmarks depicted within the geospatial data, the base map including a second depiction of the one or more landmarks and corresponds to the geographic area identified by the geospatial data based on the location data of the one or more landmarks, the base map having a projection and coordinate system;

assigning the projection and coordinate system of the base map to the geospatial data;

applying a transformation to the geospatial data based on the projection and coordinate system, the transformation aligning the first depiction of the one or more landmarks of the geospatial data to the second depiction of the one or more landmarks of the base map;

generating a tile cache based on the transformed geospatial data, the tile cache including the projection and coordinate system; and causing display of a presentation of the geographic area based on the tile cache.

16. The non-transitory machine readable storage medium of claim 15, wherein the assigning the projection and coordinate system to the geospatial data includes:

overlaying the geospatial data at a position on top of the base map;

changing a transparency of the geospatial data such that the base map is visible through the geospatial data; and aligning the position of the geospatial data to align the first depiction of the one or more landmarks of the geospatial data with the second depiction of the one or more landmarks of the base map.

17. The non-transitory machine readable storage medium of claim 15, wherein the assigning the projection and coordinate system to the geospatial data includes:

overlaying the geospatial data at a position on top of the base map;

changing a transparency of the geospatial data such that the base map is visible through the geospatial data; and scaling the geospatial data to align the first depiction of the one or more landmarks of the geospatial data with the second depiction of the one or more landmarks of the base map.

18. The non-transitory machine readable storage medium of claim 15, wherein the assigning the projection and coordinate system to the geospatial data includes:

overlaying the geospatial data at a position on top of the base map;

changing a transparency of the geospatial data such that the base map is visible through the geospatial data; and rotating the geospatial data to align the first depiction of the one or more landmarks of the geospatial data with the second depiction of the one or more landmarks of the base map.

19. The non-transitory machine readable storage medium of claim 15, wherein the geospatial data is in a first file format, the base map is a second file format, and wherein the applying the transformation includes:

converting the geospatial data from the first file format to the second file format.

20. The non-transitory machine readable storage medium of claim 15, wherein the receiving the geospatial data includes receiving a timestamp that indicates a time that the geospatial data was gathered, and wherein the set of instructions that causes the machine to perform operations further comprising:

assigning the timestamp to the tile cache.

* * * * *